US006378197B1

(12) United States Patent
Hansen

(10) Patent No.: US 6,378,197 B1
(45) Date of Patent: Apr. 30, 2002

(54) TRACK ASSEMBLY HAVING MOVEABLE FASTENING MECHANISM

(76) Inventor: Michael C. Hansen, 23791 Hwy. 99W, Junction City, OR (US) 97448

( * ) Notice: Subject to any disclaimer, the term of this patent is extended or adjusted under 35 U.S.C. 154(b) by 0 days.

(21) Appl. No.: 09/416,907

(22) Filed: Oct. 13, 1999

Related U.S. Application Data

(60) Provisional application No. 60/104,090, filed on Oct. 13, 1998.

(51) Int. Cl.[7] ................................................ B23P 19/00

(52) U.S. Cl. .......................... 29/823; 227/110; 227/111

(58) Field of Search ................................ 227/101, 110, 227/111, 148, 152, 150, 141; 269/74, 1, 329; 29/798, 823, 716; 52/749.1, DIG. 1

(56) References Cited

U.S. PATENT DOCUMENTS 3,822,817 A * 7/1974 Umphress .................. 227/110
3,935,985 A * 2/1976 Prudhomme et al. .......... 269/1
3,940,045 A * 2/1976 Verwey ...................... 227/101
4,523,706 A * 6/1985 Haley ......................... 227/110
4,662,556 A * 5/1987 Gidlund ...................... 227/111
4,936,497 A * 6/1990 Ordelt .......................... 227/5
5,125,552 A * 6/1992 Medwed
5,205,103 A * 4/1993 Burton ....................... 227/111
5,261,558 A * 11/1993 Lin
5,836,068 A * 11/1998 Bullen et al.
5,842,624 A * 12/1998 Ishida
5,964,041 A * 7/1999 Daniel

* cited by examiner

*Primary Examiner*—P. W. Echols
*Assistant Examiner*—Steven Blount
(74) *Attorney, Agent, or Firm*—Steven J. Adamson

(57) ABSTRACT

An automated fastening apparatus that includes a moveable fastening device. The fastening device is preferred provided on a platform that is moveably mounted to a linearly disposed track. A drive mechanism moves the platform and fastening device along at least a portion of the track. A non-moveable fastening device and/or multiple moveable fastening devices may be provided. Portable and non-portable embodiments are disclosed as well as tilt control, electronic sensors and firing interval selection, amongst related features.

11 Claims, 3 Drawing Sheets

TRACK ASSEMBLY HAVING MOVEABLE FASTENING MECHANISM

CROSS REFERENCE TO RELATED APPLICATIONS

This application claims the benefit of U.S. Provisional Application No. 60/104,090, filed Oct. 13, 1998, and having the same title and inventor(s) as above.

FIELD OF THE INVENTION

The present invention relates to automated mechanisms for applying fasteners. The present invention also relates to the use of such mechanisms in the panelized, modular and manufactured home industries and in related industries.

BACKGROUND OF THE INVENTION

Historically, the construction of houses and other buildings that incorporate wood or wood like material consisted substantially of building a frame and attaching siding to the exterior of the frame and lathe and plaster or sheetrock to the interior of the frame. Each framing member was installed individually to form the completed frame and the siding and interior cover were then attached one member at a time to a completed frame.

In an effort to reduce the cost of home (or other building) construction, manufactured or mobile home techniques were developed. In some manufactured home facilities, whole walls (completed wall frames with exterior sheeting attached, with or without an interior covering) are constructed at once. The walls are then interconnected to form the finished house. Amongst other considerations, manufactured homes decreased costs with more efficient construction techniques, but produced houses that lacked desired variety or customized features.

The panelizing industry is emerging as a compromise between "stick frame" construction and manufactured homes. Panelizing techniques attempt to provide customization, while providing some of the efficiencies found in manufactured home production. Panelizing facilities often include an assembly line in which forms for receiving studs are provided. A representative line may include a first station at which the studs are inserted into the form and fastened together into a wall panel frame (of a more manageable length than a manufactured home wall, e.g., often 4–12 feet). At a second station, exterior sheeting such as plywood or particle board may be applied (for an exterior wallbase). At a third and fourth station, respectively, a vapor barrier and siding may be applied, if appropriate. The various wall panels are then transported to a job site where they are lifted into place and secured.

Mechanisms used to apply fasteners during panel (or manufactured home wall) fabrication are often referred to as "nail guns" or simply "guns" and various gun arrangements are known. An example of the use of these guns in conventional wall panel formation is as follows. After a wall panel frame has been formed, sheeting or the like (for an exterior wall) is provided over the panel frame and a track assembly having a plurality of fixed position guns mounted thereon is lowered into position. The track is centered over a stud and the plurality of guns is fired causing a fastener to be driven from each gun through the plywood into the stud. The track assembly may then be positioned over the next stud, and the process is repeated. This track assembly with a plurality of guns may be hand-held (by one or more persons on each end) or formed integrally with automated machinery.

A disadvantageous aspect of prior art fixed position, multi-gun tracks, amongst others, is that they require a plurality of guns which are the most expensive part of the track assemblies. For example, if it is required to fasten every foot for a wall section eight feet in length, then nine guns are required. If it is required to fasten every 6 or 3 inches, then 17 or 33 guns are required, respectively. As applied to hand-held track assemblies, the provision of a plurality of guns is additionally disadvantageous in that it increases the weight of the assembly.

Another disadvantageous aspect of fixed position gun tracks is that since the guns are indeed fixed, it is undesirably difficult and time consuming to change their position to accommodate different panel frame configurations, or different spacing for siding or the like.

Other disadvantageous aspects of prior art track assemblies include that they utilize contact firing. Contact firing relies on mechanical activation and mechanical sensors having a higher rate of malfunction than, for example, electrical sensors. Contact fired guns also tend to have nail out problems where guns towards the top and bottom plate of a panel frame run out before "interior" guns that do not fire for window or door openings.

SUMMARY OF THE INVENTION

Accordingly, it is an object of the present invention to provide a track assembly that utilizes fewer guns without reduced performance.

It is another object of the present invention to provide a track assembly that incorporates an automatically moveable gun.

It is another object of the present invention to provide various drive mechanisms for a movable gun and to provide portable and non-portable track assembly embodiments.

It is also an object of the present invention to provide an improved gun suspension and to provide photoelectric electric or other non-mechanical sensors to detect various conditions that affect gun movement and firing.

These and related objects of the present invention are achieved by use of a track assembly having movable fastening mechanism as described herein.

The attainment of the foregoing and related advantages and features of the invention should be more readily apparent to those skilled in the art, after review of the following more detailed description of the invention taken together with the drawings.

DETAILED DESCRIPTION

Figure 1:
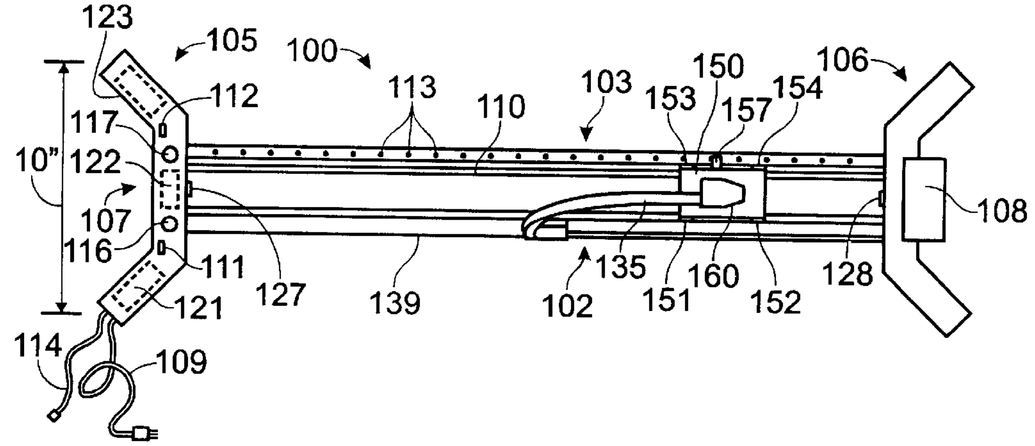
FIG. 1 is a plan view of a portable track assembly 100 having a moveable fastener mechanism in accordance with the present invention.

Referring to FIG. 1, a plan view of a portable track assembly 100 having a moveable fastener mechanism in accordance with the present invention is shown. Assembly 100 is designed for use in the panelizing industry (and in other industries). In a preferred embodiment, the track assembly has a plurality of parallel tracks (or other shaped longitudinal members) 102,103 that are disposed between two handle regions 105,106. A control panel 107 is provided in handle region 105 and a drive motor 108 is provided in handle region 106. The drive motor is coupled to a drive shaft 110 that preferably runs parallel to tracks 102,103. In use, the assembly is preferably held by two persons (one at each handle region) and placed over a stud such that the stud is centered between the first and second tracks 102,103 (see FIG. 3).

A moveable carriage 150 is provided in tracks 102,103 and mounted about drive shaft 110 as discussed in more detail below. Carriage 150 has four wheels 151–154, two of which are positioned in each of tracks 102,103. A fastening mechanism, hereinafter referred as gun 160, is mounted to carriage 150. Suitable guns are made by Senco of Cincinnati, Ohio, amongst other commercial vendors. In a preferred embodiment, electrical power, signaling and air pressure are provided to gun 160 by suitable electrical conduits and air hoses (also shown in FIGS. 2–3). Electrical power is initially delivered on cord 109 and air pressure is input on hose 114. As discussed in more detail below, appropriate electrical conduits and air hoses are provided in housing 139 and harness 135.

In accordance with the present invention, gun 160 is moved across tracks 102,103 and is programmed to fire at specific intervals. Gun movement, as alluded to above,.is achieved with a rotatable drive shaft that is coupled to a friction drive within carriage 150. Rotation of shaft 110 in a first direction causes carriage 150 to move forward from handle region 105 and rotation of shaft 110 in the opposite direction causes carriage 150 to move backward towards handle region 105.

A photo-electric sensor 157 is mounted on carriage 150. This sensor senses reference holes 113 formed in a top surface of track 103. In a preferred embodiment, the holes are spaced three inches apart and the gun is programmed to fire on every hale, every other hole, every third hole or every fourth hole, etc., thereby providing fasteners every three, six, nine or twelve inches, etc. Control knobs 116 permits selection of a desired fastener interval. Control knob 117 provides off, jog (gun movement, but no fire), and run (gun movement and fire) settings.

An operator at handle region 105 can move the gun forward or backward by depressing an appropriate control button 111 or 112, respectively. These buttons are coupled to drive motor 108 and determine which direction the drive shaft is rotated.

A three phase transformer 121 is preferably provided in handle region 105 for converting a standard 110 volt single phase A/C signal into a three phase signal. A three phase power signal is beneficial in that there are more commercially available three phase motors and they generally perform better than single phase motors. A suitable converter is made by Boston Gear. A speed control unit 123, also made by Boston Gear, provides factory set (or otherwise selected) control of the speed of the drive motor and hence the carriage.

Operation of track assembly 100 is controlled by a programmable microcontroller 122. Standard industrial programmable controllers and programming techniques therefor are known in the art. Inputs to controller 122 include buttons 111,112, control knobs 116,117, photo-electric sensor 157, and four other photo-electric sensors (two on the carriage 183,184 and one each 127,128 at the handle regions 105,106) that are discussed, below. Outputs include drive motor and air gun firing solenoid control signals. It should be recognized that remote triggering of nail guns (utilizing an air solenoid, etc.) is known in the art. A suitable programmable controller is made by Siemens.

Photo-electric sensors 127,128 are preferably located proximate handle regions 105,106, respectively. These sensors provide an interrupt signal that stops the carriage from running into the handle regions.

Figure 2:
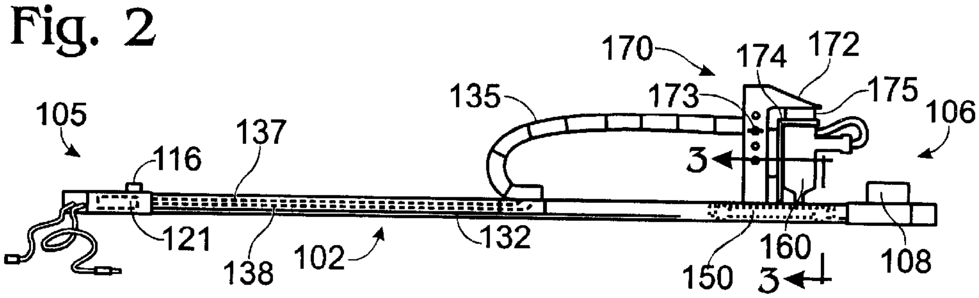
FIG. 2 is a side elevation view of the track assembly having a moveable fastening mechanism of FIG. 1 in accordance with the present invention.

Referring to FIG. 2, a side elevation view of the track assembly having a moveable fastening mechanism of FIG. 1 in accordance with the present invention is shown. FIG. 2 illustrates many of the features shown in FIG. 1, including handle regions 105,106, control button 116, track 102, harness 135, carriage 150, gun 160 and drive motor 108, amongst other components. In addition, FIG. 2 illustrates an electrical conduit 132 (removed in portion to show carriage 150), a gun tower 170 and an additional perspective on how carriage 150 fits within tracks 102,103, amongst other features.

Electrical conduct 132 provides three phase electrical power from transformer 121 to drive motor 108. The conduit is preferably provided along track 102 generally as shown and may be attached with brackets or the like. An electrical conduit 137 is also provided between transformer 121 and gun tower 170. An air hose 138 from input hose 114 is provided along with electrical conduit 137. The conduit and hose 137,138 are provided in a housing 139 along track 102 and in flexible cable and hose harness 135 that extends above the track and permits movement of the gun along the track. Suitable cable and hose harnesses and conduit arrangements are known in the art. Signal and control lines (from/to controller 122) are also preferably provided in housing 139 and harness 135 via a 12-line strip cable 136 (FIG. 3).

Gun tower 170 is configured to accommodate different sized guns. The tower consists of an internal vertical portion 171 (shown in plan view in FIG. 4) on which exterior portion 172 is mounted. The height of the exterior portion can be raised by removing pin 173, raising the exterior portion and re-inserting pin 173 through aligned holes. Gun 160 is secured to a mounting bracket 174 that is coupled to exterior portion 172. Air bellows 175 are provided between gun 160 and exterior tower portion 172 to provide shock absorption for gun 160. The bellows are preferably inflated to provide adjustable pressure against the mounting bracket. The mounting bracket is preferably screwed to the exterior tower portion and the gun 160 is preferably screwed to the mounting bracket.

Figure 3:
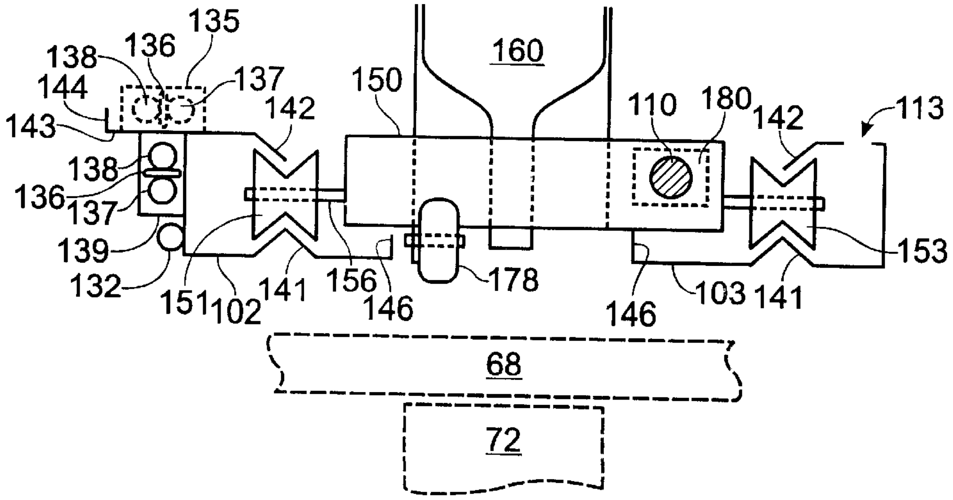
FIG. 3 is a cross-sectional view of a portion of the track assembly of FIGS. 1 and 2 in accordance with the present invention.

Referring to FIG. 3, a cross-sectional view of a portion of track assembly 100 of FIGS. 1 and 2 in accordance with the present invention is shown. Tracks 102,103 are configured to have guide protrusions 141 in which wheels 151–154 of carriage 150 are received and a lip for added rigidity. The wheels are further aligned by portion 142 that descends into a central groove of the wheels.

Housing 139 preferably extends from track 102 and houses cable 136, conduit 137 and hose 138. A top of housing 139 provides a surface 143 for receiving harness 135 (shown in phantom lines) when gun 160 nears handle region 105. Lip 144 provides a barrier and rigidity for surface 143. One of the plurality of reference holes 113 is shown in the top of track 103. Carriage 150 includes axles 156 that extend into each wheel. A friction drive 180 is provided in carriage 150 as described in more detail below with reference to FIG. 4. The drive shaft 110 is provided through friction drive 180.

FIG. 3 also illustrates that when used to attach sheeting 68, the tracks 102,103 are preferably centered over the stud 72 to which the sheeting is to be attached.

Figure 4:
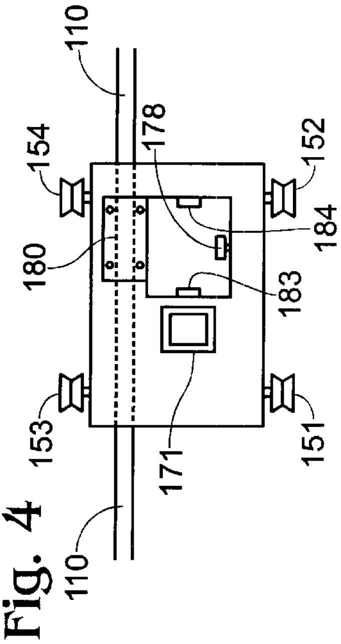
FIG. 4 is a plan view of a carriage in accordance with the present invention.

Referring to FIG. 4, a plan view of carriage 150 in accordance with the present invention is shown. FIG. 4 illustrates carriage 150 without gun 160, exterior tower portion 172, harness 135 and related components such that other features of carriage 150 can be better viewed. FIG. 4 illustrates the arrangement of friction drive 180 within carriage 150 and the insertion of drive shaft 110 through the friction drive. Photo-electric sensors 183,184 are also shown. These sensors detect whether there is a substrate (i.e., wood) underneath gun 160. The sensors are coupled to electrical conductors within cable 136. A sensor is provided for each direction of movement. If a substrate is not detected within a predefined distance (of approximately 1–2 inches) of the appropriate sensor (based on direction of movement), then the firing signal is interrupted. Wheel 178 is preferably mounted to carriage 150 or alternatively to mounting bracket 174. If one wheel is provided, it is preferably positioned parallel to and centered with the nozzle of the nail gun.

Figure 5:
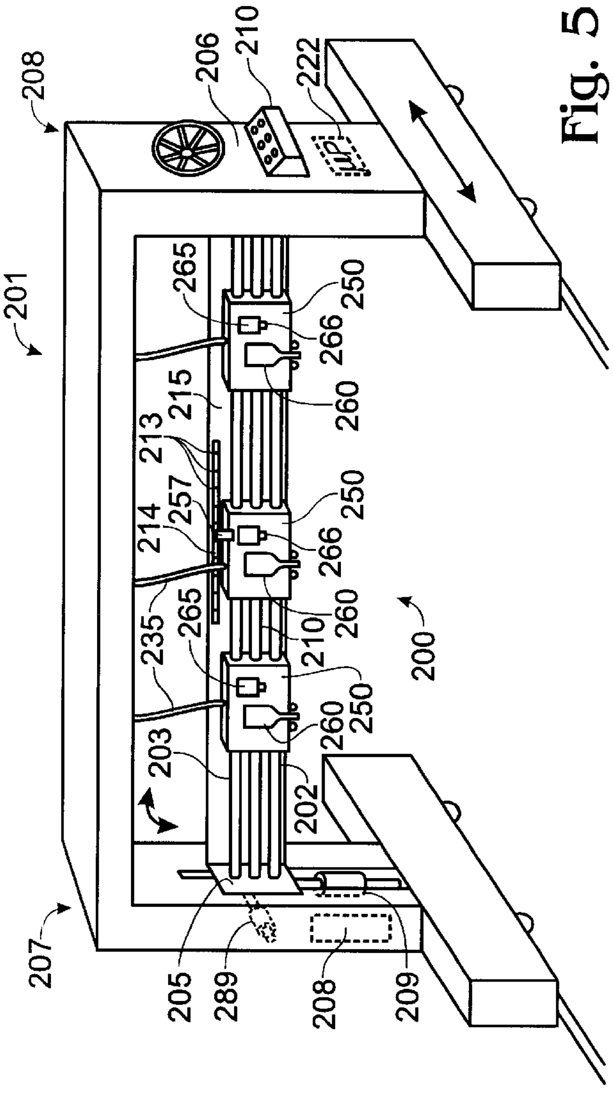
FIG. 5 is a perspective view of a track assembly having moveable fastening mechanisms in a non-portable (though moveable) bridge in accordance with the present invention.

Referring to FIG. 5, a perspective view of a track assembly 200 having moveable fastening mechanisms in a non-portable (though moveable) bridge 201 in accordance with the present invention is shown. Track assembly 200 includes many of the features of portable track assembly 100, yet incorporates them in a more heavy duty, increased performance apparatus. Track assembly 200 includes a plurality of moveable guns 260 that are each mounted on a carriage 250 (discussed in more detail below with reference to FIGS. 6–7). A small plurality of moveable guns provides the benefits of the single moveable gun assembly discussed above, with the benefit of faster performance because of multiple guns. A first (205) and second end plate (only one of which is shown due to the perspective of the drawing) are provided in the vertical support members 207,208 of the bridge. These plates are simultaneously moved up and down preferably with air pressure via cylinders 209 as is known in the art.

In a preferred embodiment, a plurality of horizontally arranged support rods (analogous to tracks 102,103) are provided between the two end plates. The top and bottom rods 202,203 have a smooth outer surface and serve as guide rods. The center rod 210 is preferably threaded and coupled to a drive motor 208 (similar to drive motor 108 discussed above). The center rod is the drive rod and it is threaded through two complementary ball screws 280 provided on each side of each carriage 250 as discussed in more detail below with reference to FIG. 6.

Track assembly 200 includes a back panel 215 that is preferably coupled between the two end plates. Additional housing members may be provided about rods (or track members) 202,203,210 as is known. These additional members, however, are not shown in FIG. 5 so that the interior components of the track assembly may be seen. A reference bar 214 having a plurality of reference holes 213 (like reference holes 113) is preferably provided on the back panel or suspended from the horizontal member of bridge 201 or the like. A photo-electric sensor 257 in the center carriage detects each hole 213 as the center carriage 250 passes by. The three carriages are preferably arranged at fixed, equal distances and configured to fire substantially simultaneously. They are further configured to cover contiguous sections such that a reference bar for one of them suffices for all three. Guns 260 are programmed to fire at every hole, every second hole, every third hole, or every fourth hole, etc., in the manner discussed above for the portable track assembly 100. Conduit and air hose harnesses 235 provide electrical power, signaling and air pressure to lo each of the carriages also as discussed above.

A programmable microcontroller 222 is provided in vertical member 208. Controller 222 operates in a manner analogous to controller 122. Control panel 210 permits operator input. Control of air cylinders and techniques for the remote firing of air guns are known in the art.

Each of the carriages 250 includes a nail reservoir 265. In a preferred embodiment, the nails are arranged in each reservoir in a spool or the like that runs out linearly. A photo-electric sensor 266 coupled to controller 222 is preferably provided adjacent to each nail supply in such a manner as to provide a nail out warning signal. A nail out warning system, permits nail supplies to be replenished before a nail out situation arises.

Figure 6:
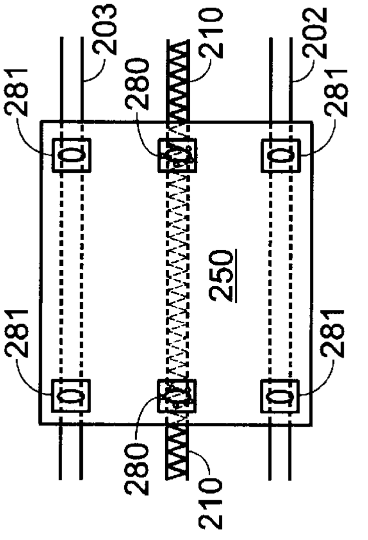
FIG. 6 is a side elevation view of one of the plurality of carriages of FIG. 5 (without a gun mounted thereon) in accordance with the present invention.

Referring to FIG. 6, a side elevation view of one of the plurality of carriages 250 of FIG. 5 (without a gun mounted thereon) in accordance with the present invention is shown. Amongst other features, FIG. 6 illustrates that drive rod 210 is threaded. Drive rod 210 is inserted through two ball screws 280 on opposite sides of the carriage. Rotation of shaft 210 causes lateral movement of carriage 250. Suitable ball screw arrangements are known in the art. The ball screws and threaded shaft illustrate an alternative manner of propelling a carriage. To provide additional support to carriage 250, a plurality of bushings 281 are provided on each of the smooth surfaced guide rods 202,203.

Figure 7:
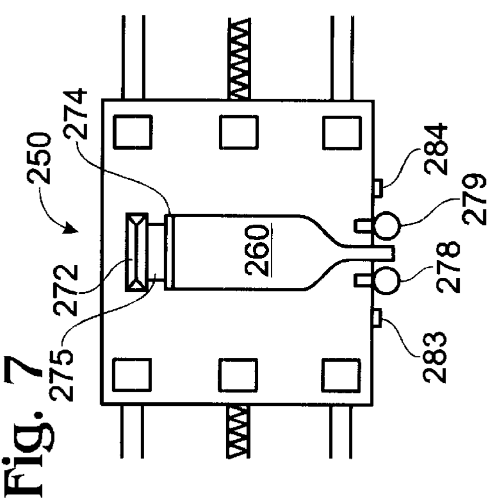
FIG. 7 is a side elevation view of one of the plurality of carriages of FIG. 5 (with a gun mounted thereon) in accordance with the present invention.

Referring to FIG. 7, a side elevation view of one of the plurality of carriages 250 of FIG. 5 (with a gun mounted thereon) in accordance with the present invention is shown. Gun 260 is preferably coupled to a mounting bracket 274 that is in turn mounted to an exterior lo portion 272 that is generally vertically disposed. Air bellows 275 provide shock absorption. First and second photo-electric sensors 283,284 (analogous to sensors 183,184) are provided in addition to support wheels 278,279 that preferably ride on the surface of the wood or other material during operation. Wheels 278, 279 are preferably placed in line with the nozzle of the gun.

Figure 8:
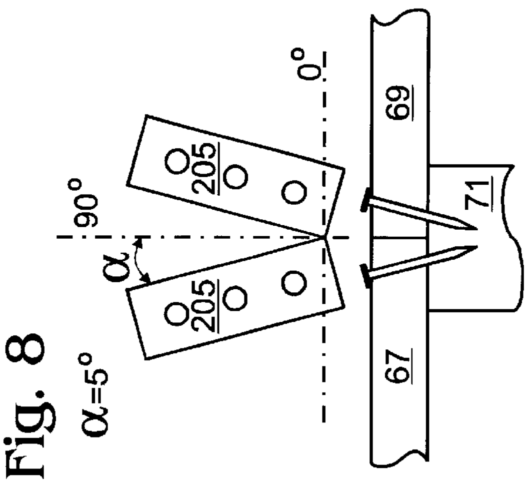
FIG. 8 is a diagram illustrating tilt of track assembly in accordance with the present invention.

Referring to FIG. 8, a diagram illustrating tilt of track assembly 200 in accordance with the present invention is shown Referring also to FIG. 5, bridge 201 preferably includes an air cylinder 289 or the like in each vertical member that rotates or tilts its corresponding end plate up to five degrees on either side of vertical. This tilt feature (illustrated in cross section in FIG. 8) permits the secure fastening of two sheets of material 67,69 onto a single stud 71. In conventional track assemblies, that fire straight down, it is possible to split the stud (or a portion thereof) as a result of firing too close to the edge of the stud. The tilt feature of the present invention provides significantly less risk of splitting or otherwise fracturing the underlying stud. Tilt control is achieved via control panel 210 and controller 222 using conventional techniques.

Figure 9:
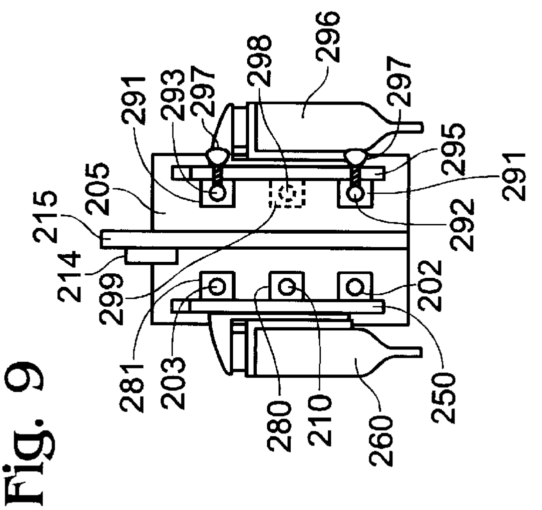
FIG. 9 is a cross-sectional view of track assembly illustrating both automatically moveable and manually moveable guns in accordance with the present invention.

Referring to FIG. 9, a cross-sectional view of track assembly 200 illustrating both automatically moveable and manually moveable guns in accordance with the present invention is shown. FIG. 9 illustrates rods 202,203 and 210, moveable carriage 250, gun 260, ball screw 280 and bushings 281. On, for example, the other side of panel 215 or otherwise coupled to or positioned relative to end plate 205, two additional rods 292,293 may be provided. A set of bushings 291 are coupled to a carriage 295 and rod 292,293 are fed through the bushings. Clamps 297 (or thumb screws of the like) are provided through the bushings or elsewhere in carriage 295 to permit an operator to releasably secure carriage 295 to rods 292,293. In this manner, gun 296 can be placed in a desired position and secured there. If four guns 296 are provided in this manner then they may be adjusted to insert fasteners into the top plate, window/door header, window sill and bottom plate of a panel frame, i.e., in the direction generally perpendicular to the direction in which automatically moveable guns 260 insert their fasteners. In addition, a drive shaft 298 and a friction drive or ball screw or the like 299 can be provided to move one or more of carriages 295. For example, this would permit automatic movement of the gun that fastens the top plate when the wall height varies between panels.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A portable automated fastening apparatus, comprising:

a first linearly disposed track and a second linearly disposed track, said first and second tracks being arranged in a substantially parallel manner and having lengths approximately two times or more the height of said fastening apparatus;

a first handle provided at a first end of said tracks and a second handle provided at an opposing end of said tracks, wherein said tracks and said handles are arranged such that in use for fastening sheeting to a frame, said tracks are disposed in a substantially horizontal manner relative to one another and said first and second handles permit a first user and a second user, respectively positioned at the first and second handles, to move the tracks in and out of position over sheeting to be fastened to a frame;

a platform configured for low friction movement along said tracks and a fastener emitting device provided on said platform;

a drive mechanism for controllably and automatically driving said platform and fastener emitting device along said tracks;

a control circuit provided in at least one of said handles and coupled to said drive mechanism for controlling the automatic movement of said platform and the firing of said fastener emitting device;

a user interface provided in at least one of said handles and coupled to said control circuit to permit a user to operate said control circuit.

2. The apparatus of claim 1, further comprising sensors coupled to said control circuit that detect when to emit or not to emit a fastener from said fastener emitting device.

3. The apparatus of claim 2, further comprising a firing guide mechanism distributed proximate at least a portion of one of said tracks in a substantially linear manner and having a plurality of detectable elements that are detectable by said sensors.

4. The apparatus of claim 3, wherein said detectable elements are disposed at uniformly spaced intervals.

5. The apparatus of claim 4, wherein said control circuit is configured such that a user may select, via said user interface, which of the detectable elements, detected by said sensors, instigate discharge of a fastener from said fastener emitting device.

6. The apparatus of claim 1, wherein said driving mechanism includes a rotating drive shaft.

7. The apparatus of claim 1, wherein said driving mechanism includes a friction drive.

8. The apparatus of claim 1, further comprising electronic sensors coupled to said control logic that determine where to start or stop movement of said fastening device along said track.

9. The apparatus of claim 1, further comprising electro-optic sensors coupled to said control logic that detect when to emit a fastener from said fastener emitting device.

10. The apparatus of claim 1, further comprising a fastening device that in use is coupled to said tracks in a non-movable manner.

11. The apparatus of claim 1, further comprising a second fastening device that in use is coupled to said track in an automatically moveable manner.

* * * * *